Nov. 21, 1933.  W. LELGEMANN  1,936,539
PROCESS OF CONTINUOUSLY TREATING HYDROCARBON PRODUCTS
Filed Sept. 21, 1931
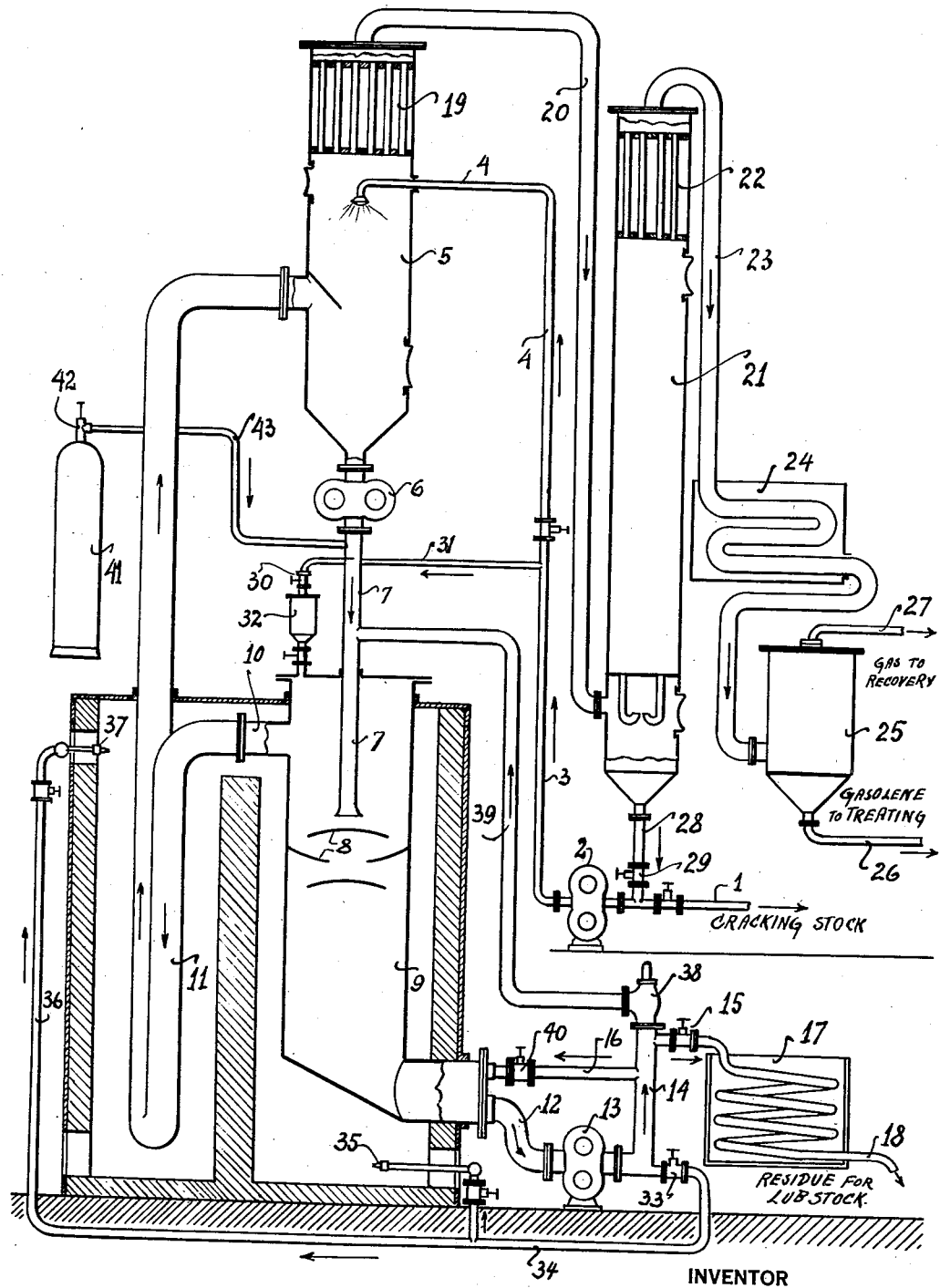
INVENTOR
William Lelgemann
BY himself as
ATTORNEY Patented Nov. 21, 1933

1,936,539

UNITED STATES PATENT OFFICE 1,936,539

PROCESS OF CONTINUOUSLY TREATING HYDROCARBON PRODUCTS

William Lelgemann, Ridgefield Park, N. J., assignor of one-half to H. Theodore Sorg, Newark, N. J.

Application September 21, 1931
Serial No. 564,142

9 Claims. (Cl. 196—54)

This invention relates to a process for treating an oil or oils or material containing the same, such as petroleum and other mineral oils, shale oil, etc. and distillates, fractions or residues obtained therefrom or admixed therewith, and other hydrocarbons and hydrocarbonaceous mixtures of relatively high boiling point, into a lower boiling, more easily vaporizable or more volatile material, in order to produce a gasolene substitute therefrom, and a material which will be capable of direct use in an internal combustion engine.

By means of my invention, mixtures of hydrocarbons of relatively lower boiling points are obtained and hydrocarbon mixtures boiling at relatively higher temperatures, and not only are suitable mixtures of oil vapor containing little or no tarry matters obtained, but the process may be operated continuously, in the absence of entering steam into the mixture and at normal or elevated atmospheric pressures, thus obviating the necessity for the employment of intricate and costly equipment, and admitting of a product being continuously produced of uniform range of physical constants and rate of combustion.

In the following description, I make use of the term "hydrocarbon" in a general sense to designate mixtures such as mineral oils, shale oil, schist oil, and asphaltic bases, as well as residues, fractions and distillates therefrom and the like, being suitable raw materials applicable to my process to be herein described.

One of the objects of this invention relates to an improved continuous heat treatment for "hydrocarbons" and the manufacture therefrom and thereby of a highly refractive, very mobile, volatile and inflammable spirit, which has a wide solvent power for a large number of chemicals and substances in addition to its value as a gasolene or substitute therefor.

One of the principal obstacles encountered in processes of this nature heretofore has been the deposition of carbon on the inner surfaces of the pipes in the apparatus in which the oil is heated, which not only renders it increasingly difficult to transmit external heat through the walls of the chamber or pipes to the interior, but the carbon has ultimately clogged up the passages to the point where the apparatus has been rendered ineffective or inoperative. This and similar difficulties are obviated in my process or are apparent to such a minimum degree as not to seriously interfere with the operating efficiency of the process as a whole. In my process herein described, the relatively small amount of carbon formed seems to be in a colloidal or highly dispersed condition, which does not deposit upon the walls of the pipe or apparatus, at least not in an objectionable amount.

The commonly used modes of treating petroleum are reflux distillation followed by progressive distillation, generally fractional, in which the different hydrocarbon compounds and mixtures (the so-called "cuts") are successively distilled off in the order of their relative volatility.

One method of carrying my process into effect is illustrated in the attached drawing, in which the oil to be cracked enters through pipe 1, pump 2, pipes 3 and 4, into an open space tower 5 where it is preheated by the rising mixed hydrocarbon vapors and catalyzer gases, serving at the same time to condense the heavier boiling uncracked portion and to contact with the catalyzer placed in gas form in the same zone. This oil-catalyzer mixture is introduced in a direct way through pump 6 and pipe 7 over contact plates 8 in the heating apparatus 9. This results in the advantage that the catalyzer tends to agglomerate or crystallize in tower 5 by means of cooling and thereby becomes admixed with the introduced crude hydrocarbon product, which is pumped out of tower 5, and obviates the possibility of settling or depositing on the lower portion of the tower.

In the heating unit 9, the hydrocarbon oils are in intimate contact with the catalyzing material, heated with or without pressure to the desired temperature range of 350–1300° F., and the here produced hydrocarbon vapors and catalyzer gases are led back, passing contact plates 8 through pipe 10 into the vapor phase cracking coil 11, and from there into tower 5. The higher boiling hydrocarbon residues and catalyzer, either condensed or crystallized are being re-introduced into the heating apparatus 9 by pump 6, pipe 7.

In order to establish in heating apparatus 9 an intensive contact of catalyzer with the heavier hydrocarbon residues having a tendency to collect on the bottom, this aforementioned catalyzer-oil mixture is pumped through pipe 12, pump 13, pipe 14, relief valve 38, pipe 39 into pipe 7, and passes again over contact plates 8 into heating apparatus 9, thereby assuring contact of maximum intimacy. A further means of agitation is by pumping the catalyzer-oil mixture through pipe 12, pump 13, pipes 14 and 16, and valve 40, back into heating apparatus 9.

Through setting of the relief valve 38 at about 25 lbs. pressure above the pressure in the cracking apparatus, the possibility is given that a portion of the uncracked or only partially cracked high saturated residue oil is withdrawn from system by way of pipe 14, valve 15, cooler 17, discharge pipe 18, and can be used for the production of high grade lubricating oil. At the same time, a portion of the residue oil can be led through valve 33, pipes 34 and 36 into the oil burners 35 and 37.

The low boiling hydrocarbons are partly fractionated in tower 5 by means of control head 19 and introduced through pipe 20 into the final fractionating tower 21, which is equipped with bubble plates or chemical rings not shown, and there fractionated into the desired cuts or fractions. The final gasolene vapors are led through control head 22, pipe 23 into condenser 24, here being condensed and liquefied, and the finished product—gasolene or motor fuel—flows through the gas separator 25, and pipe 26, out of the system.

This eventually forms fixed gases which are led through pipe 27 to recovery, or may be burned under the still.

If with the uncondensable gases, it can be replaced into the process without interruption through filling tank 32. A part of the crude oil can be used to spray the catalyzer through valve 30 and pipe 31 out of tank 32 into the heating apparatus 9.

In the fractionating tower 21 the condensed heavier products are mixed by way of pipe 28, valve 29 in pump 2 with the crude oil, and thus re-introduced into the process through pipes 3 and 4. Nitrosyl chloride is introduced from pressure tank 41 through valve 42, pipe 43 into pipe 7, and mixes here with the catalyzer-oil mixture, passing over contact plates 8 into heating apparatus 9 and here re-activates the catalyzer.

My improved method, which is continuous, comprises catalytic and distillatory actions, thereby forming lower boiling and more valuable compounds from higher boiling and less expensive mixtures. It comprises heating the raw material containing hydrocarbons by means of any appropriate source or heat, applied in an advantageous manner, whereby the vapors are condensed by means of a reflux condenser, the mechanical arrangement and preferred method of operation, being specified, claimed and illustrated in my copending application. The amount and physical and chemical constants of the fraction or fractions obtained depending upon (1) the nature of the hydrocarbon raw material; (2) the heating temperature; (3) the constants of the materials obtained in the subsequent distillation process; (4) the nature and amount of catalytically acting material employed and (5) the time and temperature factor in the various stages or phases of the operation.

The degree of heat applied to the hydrocarbon raw material in the heating chamber will vary depending upon the nature of the raw material operated upon, the speed with which the process is carried out, and the physical constants desired in the finished product.

As catalytic material I prefer to use a halogenated oxide of nitrogen, chlorine being at the present time the least expensive of the halogens and an appropriate halogen to use in this connection, a nitrogen oxychloride or nitrogen chlor oxide such as nitrogen mono-oxide mono-chloride (NOCl) sometimes called nitrosyl chloride, having been found especially satisfactory. The nitrosyl chloride is never used lone, but always in conjunction with the haloid compound of a metal of Group III of the Mendeleeff System of Periodicity of the Elements, of which the least expensive of the elements in this group in haloid or halide combination is aluminum, the chloride of which has been found satisfactory for use in combination with nitrosyl chloride for the transformation of relatively higher boiling hydrocarbons into those of relatively lower boiling point by means of my invention. However, I have not obtained as satisfactory results by the use of nitrosyl chloride alone, that is, in the absence of no absorbent material such as silicon dioxide, or absorbents in which silicon dioxide has been partially or wholly replaced by other bodies as asbestos or other aluminum or magnesium containing bodies, being necessary in my process. I prefer to use that chloride of aluminum known as aluminum trichloride, preferably in the substantially anhydrous condition.

I have obtained satisfactory results also by using boron trifluoride, boron tribromide and/or boron tri-iodide, but the trifluoride is normally a gas, and the bromine and iodine compounds are too expensive. Likewise aluminum trifluoride, tribromide and tri-iodide react satisfactorily, but aluminum trichloride is comparatively inexpensive, and readily obtainable in desired quantities.

This process is especially applicable to the treatment of gasoline residues from crude natural oils or the crude oil obtained from cracking, where it is desired to obtain more volatile hydrocarbon mixtures from less volatile hydrocarbon compounds and combinations.

The commercial form and purity of nitrosyl chloride and aluminum chloride is sufficiently pure and concentrated for the purposes of carrying out this invention.

Of the several ways of carrying my invention into practical effect and employing nitrogen oxychloride in conjunction with a halogen compound of Group III of the chemical elements. The following example is illustrated of one method, and this example is based upon the use of any gasoline or similar residue, or residue from which the gasoline fraction has been partially or wholly removed, as obtained from natural petroleum, it being understood that the materials employed with the hydrocarbon raw material used will vary in quality and in steps, degree and speed of operation depending upon the constants of the raw material used, and the constants desired in the finished material.

Based upon a 100 pound initial charge of raw material in starting the continuous process, this is placed in the heating chamber and 5 to 10 pounds of aluminum chloride incorporated therewith in any convenient manner whereby homogenously appearing admixture results. Or the aluminum chloride may be admixed with the charging stock outside the heating chamber. The chloride may be mixed with the charging stock at room temperature and subsequently heated, or admixed with the heated charging stock. The cracking temperature lies within the range 250°–700° F. for the majority of raw materials operated upon, and when the mass in the heating chamber has been heated to incipient cracking of the hydrocarbon material therein, nitrosyl chloride is admitted, intermittently, or preferably in a continuous manner in the ratio of about two to three ounces to each 5 pounds aluminum chloride therein. The admission of nitrosyl chloride is continuous in the ratio of about 4 to 6 ounces per 100 pounds of charging stock introduced after the process has become reactive. The aluminum chloride does not require renewing, at least, in one series of over one hundred successive treatments of definitely introduced amounts of nitrosyl chloride and charging stock as above illustrated, the aluminum chloride had apparently not been reduced in its desirable catalytically acting capacity. My process therefore, comprises in its broad scope the continuous or perpetual fortification or rejuvenation of aluminum chloride as a catalytically acting body in changing relatively high boiling hydrocarbons to relatively lower boiling ones, by means of the continual introduction of definite amounts of nitrosyl chloride into a heated chamber in which is present aluminum chloride and the products of its decomposition, and in which, is being introduced in a continuous manner, definite amounts of charging stock relative to the amount of nitrosyl chloride entering the heated chamber.

I am aware that incident to the reactions involved, the chloride in the nascent or super-reactive state combines with a proportion of iron of which the heating chamber is wholly or partially constructed so that there is present after the operation has proceeded for a time, a proportion of iron chloride in addition to aluminum chloride, but the presence of this iron compound is not detrimental to the process. However, it has been found that the aluminum chloride does not reactivate, at least, to the desired degree or point until a temperature above 250° F. has been reached.

Only atmospheric pressure, or a relatively low pressure above atmospheric is used, and no steam or other form of water, or water vapor, is introduced at any time into the heated chamber.

This method may be modified according to the relative refractivity of the raw material, its composition, the degree of heat applied, and the temperature of the cut or fraction it is desired to obtain. The amount from hydrocarbons of relatively higher boiling point by heating the same in the presence of a catalyst re-activated by nitrosyl chloride, what I claim as new and desire to secure by Letters Patent is:—

1. A process for the continuous conversion of high-boiling hydrocarbon fractions comprising heating the same in a chamber to a temperature of 250°–700° F. with a halogenated oxygen compound of nitrogen and an aluminum halide in amount not exceeding ten percent by weight of the original charge, until a gasolene substitute is obtained.

2. A process for the continuous conversion of high-boiling hydrocarbons comprising heating the same in a chamber to the desired conversion temperature with aluminum chloride in the presence of nitrosyl chloride until a sufficient amount of relatively lower boiling fraction has been formed.

3. A process for the continuous cracking of hydrocarbon products comprising heating the same in a chamber to a cracking temperature above the point of distillation and in the presence of aluminum chloride which is being continually activated by the presence of nitrosyl chloride until a sufficient amount of relatively lower boiling fraction has been obtained.

4. A process for the continuous distillation of petroleum products comprising heating the same in a chamber to a temperature around 600° F. with aluminum chloride in the presence of nitrosyl chloride until products of lower boiling point relative to the boiling point of the initial charge are produced.

5. A process for the continuous decomposition of petroleum residues comprising heating the same in a chamber to a temperature between 250° F. and 700° F. with nitrosyl and aluminum chlorides until lower boiling point products are obtained.

6. A process for the continuous cracking of petroleum-containing mixtures comprising heating the same in a chamber to the desired cracking temperature with a chlorine oxygen compound of nitrogen and aluminum chloride in amount not exceeding five per cent of the distillate obtained in conjunction with carbon.

7. A process for the continuous treatment of petroleum products admixed with 5% to 10% of aluminum chloride comprising heating the same in a chamber to a temperature between 250° and 700° F. reactivating the aluminum chloride catalyst by continually introducing into the reaction chamber about 5 ounces of nitrosyl chloride per hundred pounds of charging stock introduced, thereby producing hydrocarbons of relatively lower boiling point.

8. In a process for the continuous production of relatively lower boiling point hydrocarbons from aliphatic petroleum products, comprising introducing into a heated reaction chamber about 8 pounds aluminum chloride and 100 pounds of charging stock which has been heated to a temperature above 250° F., adding charging stock and nitrosyl chloride, the latter in amount of about 2 parts to about 100 parts of the former continuing the uniform addition of nitrosyl chloride and charging stock in about this ratio with the continued application of a temperature lying between 250° F. and 700° F. meanwhile distilling off lower boiling portion, until the amount of charging stock desired has been so treated.

9. The use of nitrosyl chloride as an activating agent for aluminum chloride in the cracking of petroleum products into relatively lower boiling aliphatic fractions to a temperature not exceeding 700° F., substantially as set forth herein.

WILLIAM LELGEMANN.